Nov. 11, 1969  A. J. SILVERMAN ETAL  3,478,288
ASYMMETRIC ROTOR PLATE MEANS FOR AN ELECTROMAGNETIC
INDICATING APPARATUS
Filed Aug. 5, 1968  4 Sheets-Sheet 1
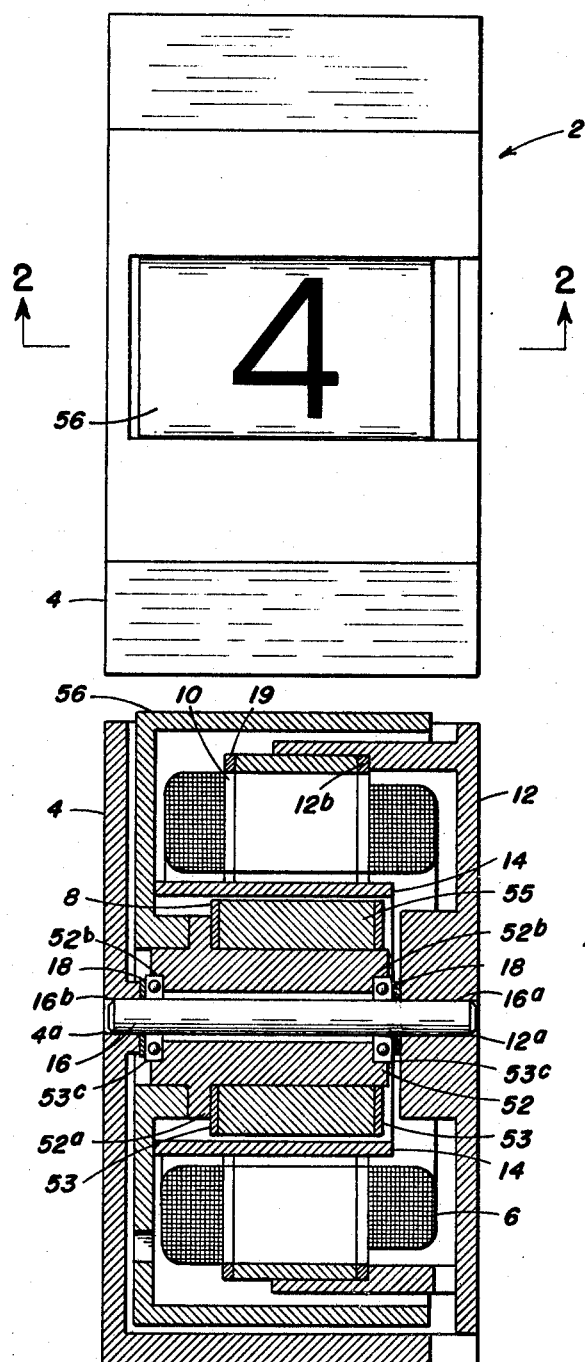
INVENTORS
Alvin J. Silverman
Stanley Steinberg
BY
Edward H. Loveman
ATTORNEY Nov. 11, 1969  A. J. SILVERMAN ETAL  3,478,288
ASYMMETRIC ROTOR PLATE MEANS FOR AN ELECTROMAGNETIC
INDICATING APPARATUS
Filed Aug. 5, 1968  4 Sheets-Sheet 2
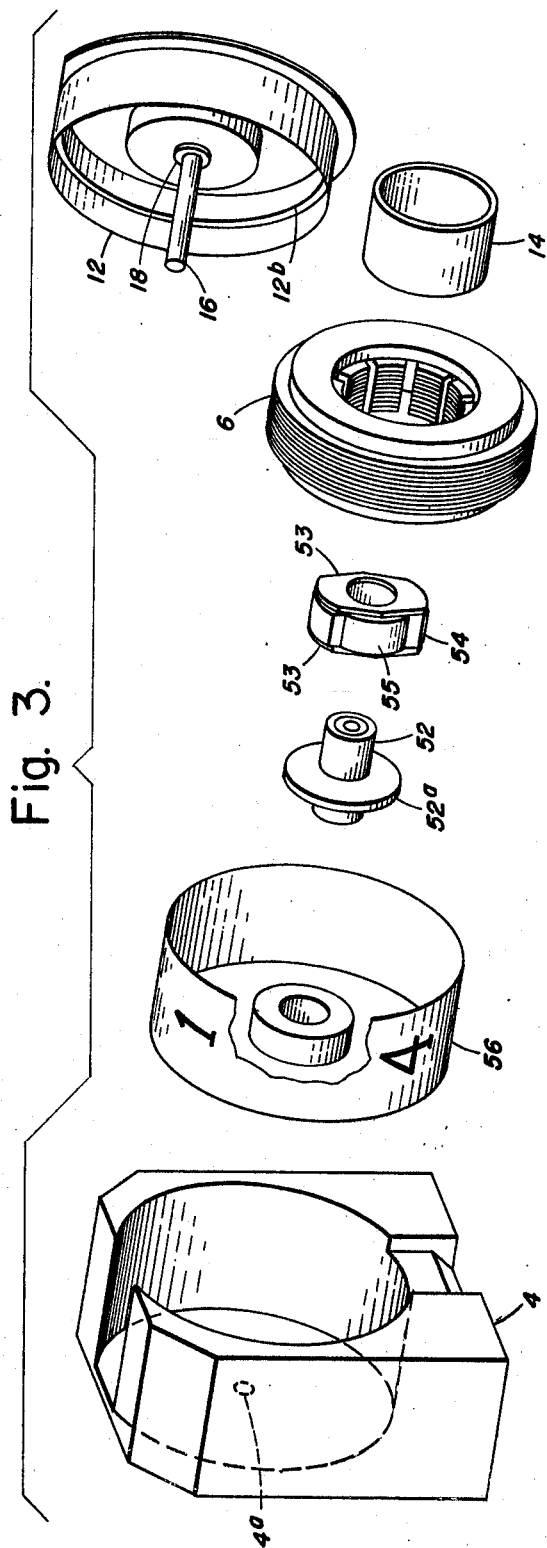
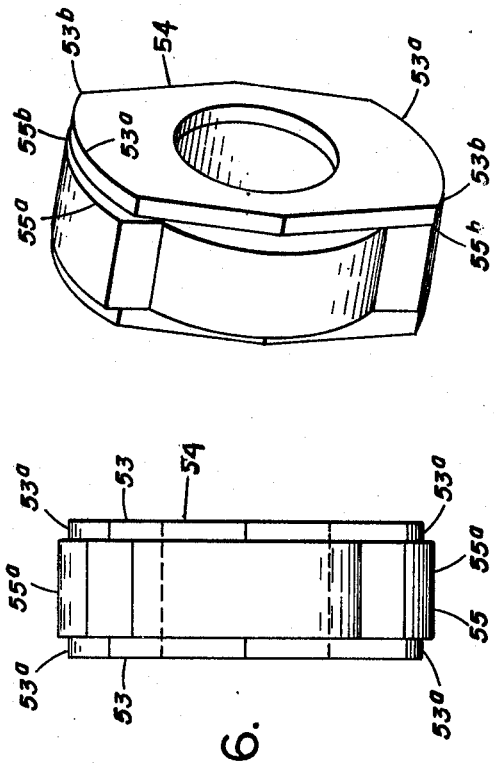
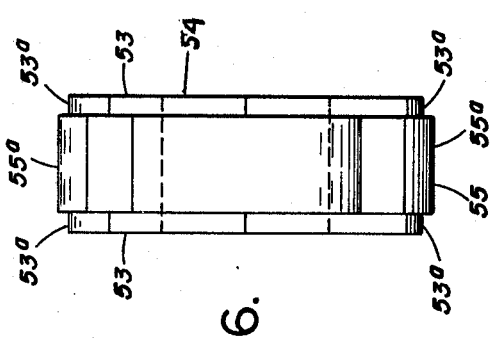
INVENTORS
Alvin J. Silverman
Stanley Steinberg
BY
Edward H. Loveman
ATTORNEY Nov. 11, 1969    A. J. SILVERMAN ETAL    3,478,288
ASYMMETRIC ROTOR PLATE MEANS FOR AN ELECTROMAGNETIC
INDICATING APPARATUS
Filed Aug. 5, 1968    4 Sheets-Sheet 3

INVENTORS
Alvin J. Silverman
Stanley Steinberg

BY

*Edward H. Loveman*
ATTORNEY

INVENTORS
Alvin J. Silverman
Stanley Steinberg

BY

Edward N. Loveman

ATTORNEY

United States Patent Office 3,478,288
Patented Nov. 11, 1969

3,478,288
ASYMMETRIC ROTOR PLATE MEANS FOR AN ELECTROMAGNETIC INDICATING APPARATUS
Alvin J. Silverman, West Massapequa, and Stanley Steinberg, Plainview, N.Y., assignors to Vernitron Corporation, New York, N.Y.
Filed Aug. 5, 1968, Ser. No. 750,071
Int. Cl. H01f 7/08
U.S. Cl. 335—229                                          6 Claims

ABSTRACT OF THE DISCLOSURE

An improved electromagnetic indicator wherein at least one magnetizable plate is attached to a two pole magnetic rotor. The magnetic plate has ends which are asymmetric with the magnetic axis of the rotor for insuring motion of the rotor when it is desired to rotate the rotor 180° from a fixed position by reversing the magnetic field between one pole of the magnetic rotor and a salient pole on a stator surrounding the rotor. The improved indicator also has a non-magnetic member, in the air gap between the rotor and stator, for generating currents in a secondary field which substantially reduces oscillation of the rotor when it is moved from one position to another.

---

The present invention relates to electromagnetic indicator apparatus and more particularly to an electromagnetic indicator apparatus having a permanent magnet rotor which is adjustably positioned to any one of a plurality of discrete positions by electrical impulses selectively applied to electromagnets surrounding the rotor, and more specifically to improvements in an electromagnetic indicator apparatus of the type disclosed in U.S. patent application 661,308 filed Aug. 17, 1967 by Alvin J. Silverman and Albert Diamond.

In the aforementioned U.S. patent application Ser. No. 661,308, there is shown an electromagnetic apparatus wherein ambiguities in the selection of an indicator angular position displaced 180° is overcome by having an asymmetric magnetic formation on the tips of the magnetic poles of the rotor. The asymmetric magnetic formation does not affect alignment of the rotor with an attracting energized stationary electromagnet but will misalign the rotor whenever 180° reversal of angular position is commanded. This novel arrangement operates very satisfactorily in indicators having magnetic rotors of substantial diameters, the end portions of which have asymmetric tips of magnetizable material. However, for small diameter indicators, e.g. under 1" in diameter, the magnetic rotor may be too small to be asymmetrically shaped and there may be insufficient space between the end of the magnetic pole and the stator assembly to insert an asymmetric magnetizable structure. Furthermore, the magnetic axis in the rotor may not be located centrally thereof, due to a lack of homogeneity of the rotor material, and thus the holding or detent force will not prevent oscillation as the rotor is attracted to the energized electromagnet position.

In accordance with the invention, the magnetic rotor has at least one magnetizable member which has asymmetric ends to eliminate the ambiguity problem when it is desired to angularly displace the rotor 180° from a fixed angular position. In addition, a damping device is provided to reduce oscillation of the rotor whenever it is rotated to a new angular position. The damping device consists essentially of a cylindrically shaped conducting but preferably non-magnetizable member which is supported on the stator in a concentric air gap between the stator and the rotor and within the flux field of the magnet. Therefore, when the rotor is energized to a new angular location, a secondary flux field is induced in the cylindrical member which opposes the rotation of the rotor thereby providing a damping force which is proportional to the speed of the rotor.

Accordingly, a primary object of the invention is to provide an improved electromagnetic indicating apparatus to provide a plurality of discrete angularly spaced indicating positions.

It is another object of the present invention to provide an improved electromagnetic indicating apparatus such that when it is desired to rotate the apparatus 180° from a fixed position, ambiguities as to the rotation of the apparatus are eliminated.

It is another object of the present invention to provide an improved electromagnetic indicating apparatus wherein the rotating member is damped to reduce oscillations at the energized position.

These and other objects and many of the attendant advantages of this invention will be readily appreciated as the same becomes better understood by reference to the following detailed description when considered in connection with the accompanying drawings, in which FIG. 1 is a front elevational view showing an indicating apparatus constructed in accordance with the present invention;

FIG. 2 is a sectional view taken along line 2—2 of FIG. 1;

FIG. 3 is an exploded prospective view of the indicating apparatus of FIG. 1;

FIG. 6 is a side elevational view of the rotor assembly;

FIG. 7 is an isometric view of the rotor assembly;

Figure 4:
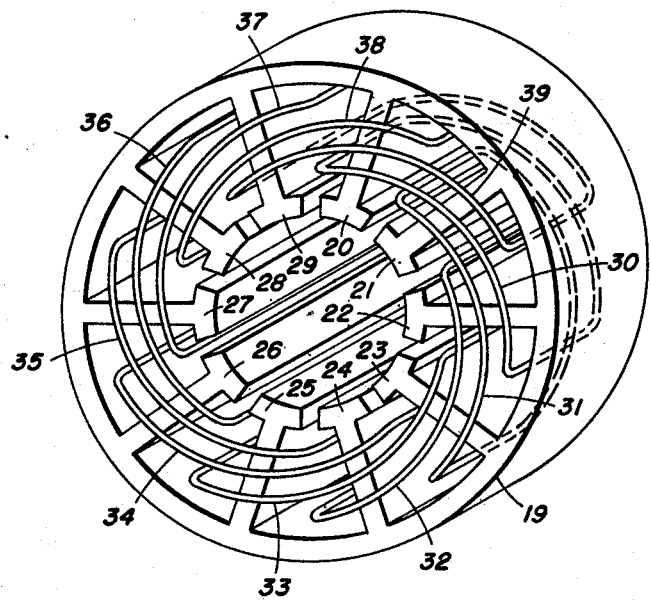
FIG. 4 is a perspective view of the stator and of hte present invention.

Referring now to the drawings, wherein like reference characters designate like or corresponding parts throughout, there is shown in FIGS. 1 through 3 a readout apparatus generally designated by reference numeral 2 which is comprised of a housing 4, a stator assembly 6 and a rotor assembly 8. The stator assembly 6 is comprised of stator 10, a core holder 12, an inner sleeve 14 and a shaft 16 which has one end 16b firmly fixed in an aperture 4a of the housing 4. A shim or washer 18 is placed on each side of the rotor assembly 8, on the shaft 16, to prevent the rotor assembly from binding on the stationary stator assembly 6 or housing 4. Inner sleeve 14 is manufactured from a nonmagnetizable material, preferably copper, and is cemented to the coreholder 12 in the air gap between the stator 10 and the rotor assembly 8 for a purpose to be more fully described below. The coreholder 12 is undercut at 12b (FIGS. 2 and 3) to position and secure in the coreholder aperture 12a by an adhesive, pinning or other conventional means well known in the art.

The rotor assembly 8, as best shown in FIGS. 2 and 3, is comprised of a hollow cylindrical sleeve 52 for supporting a rotor 54 and an indicator drum 56. The sleeve 52 has a raised angular shoulder 52a intermediate the ends of the sleeve with one side of the shoulder 52a (the right side as shown in FIG. 3) serving as a stop for the rotor 54 and the other side serving as a stop for the indicator drum 56. The bore of the hollow sleeve 52 has enlarged apertures 52b at each end of the sleeve which houses a bearing 53c whereby the rotor assembly 8 may rotate freely around stationary stator shaft 16. The rotor 54 (FIGS. 6 and 7) is comprised of a two pole magnet 55 which is sandwiched between a pair of plates 53. The plates 53, which may be fastened to magnet 55 by cement or by other conventional means, are manufactured from a soft magnetizable material and have arcuate ends 53a. One corner 53b of each arcuate end 53a is aligned with a corresponding corner 55b of the magnet 55 and as shown most clearly in FIG. 8, the arcuate end 53a is not concentric with an end 55a of the magnet and thus may be termed asymmetrically shaped with respect to the vertical axis through the center of magnet 55. The asymmetrically shaped ends have been formed for a reason which will hereinafter be explained in detail. The indicator drum 56 and the rotor 54 may be secured to the sleeve 52 by force fit, keying or other well known conventional means.

Figure 5:
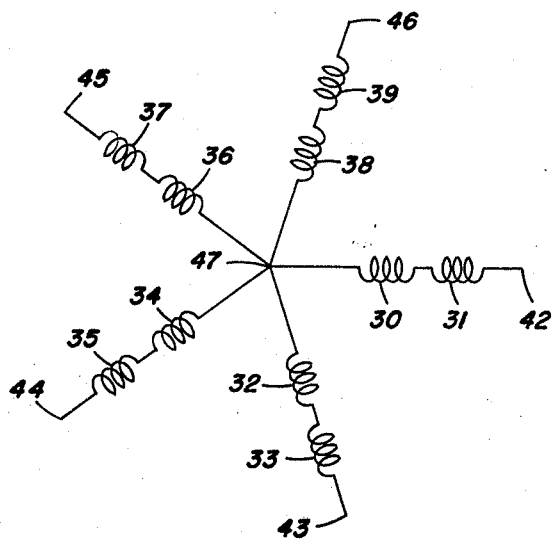
FIG. 5 is a schematic view of an electric circuit of the indicating apparatus of FIG. 1.

Referring now to FIG. 4, there is shown a magnified view of the stator 10 comprised of a core 19 having a plurality of angularly spaced radially outstanding teeth 20–29. That is, the teeth 20–29 are disposed in an angular array on the inner circumference of the core 19 and may be longitudinally coextensive with the core having a generally T-shaped cross-sectional configuration. It is preferable that the core 19 and its teeth 20–29 be formed of a plurality of laminations of magnetically soft material which are cemented or otherwise formed together. Electrical conductors or wires are wound about the teeth 20–29 to form a plurality of coils 30–39. As appears schematically in FIG. 4, each coil 30–39 extends about three teeth. It should be noted that each adjacent coil extends about a pair of common teeth. For example, the coils 30, 31 extend about the common teeth 21 and 22 and, as shown in FIG. 5, adjacent coil pairs are joined together to form a single electrical phase. Thus for example, the coils 30 and 31 are connected together in series to define electrical phase 42. Similarly, coils 32 and 33 form phase 43; coils 34 and 35 form phase 44; coils 36 and 37 form phase 45; and coils 38 and 39 form phase 46. Each of the phases 42–46 may in turn be connected to a common or ground potential 47.

The angular distance or arc encompassed by each phase may be considered as the pole arc or pole pitch. In the illustrated embodiment of FIG. 4, the pole arc or pitch is equal to the angle subtended by four teeth. For example, the pole arc of phase 42 is the angle subtended by teeth 20–23. It will now be appreciated that the magnetic field of the pole arc of phase 42 is centered between teeth 21 and 22; and further, by the overlapping of coils 30 and 31 about common teeth 21 and 22, the magnetic field of phase 42 has its central or medial region magnetically enhanced or heightened to define an intensified salient pole 70 comprised of the teeth 21 and 22 (FIG. 8).

In addition to individual excitation or energization of a selected phase 42–46, a pair of adjacent phases may be simultaneously excited. For example, upon excitation of adjacent phases 42 and 43 in addition to the overlapping of the coils of the respective phases, there is also overlapping of the coils of the separate phases so that three coils of the phases 42 and 43 extend about or are common to teeth 22 and 23. This serves to enhance the flux pattern created and locate a salient pole with its center between teeth 22 and 23. Continuing the above reasoning, it will be apparent that a number of salient poles may be created by excitation of phases either separately or in pairs equal to the number of teeth 30–39 and double the number of phases. Also, the field pattern of the magnetomotive force of the salient poles thus created is such as to more positively locate the salient pole center or medial position.

Figure 8:
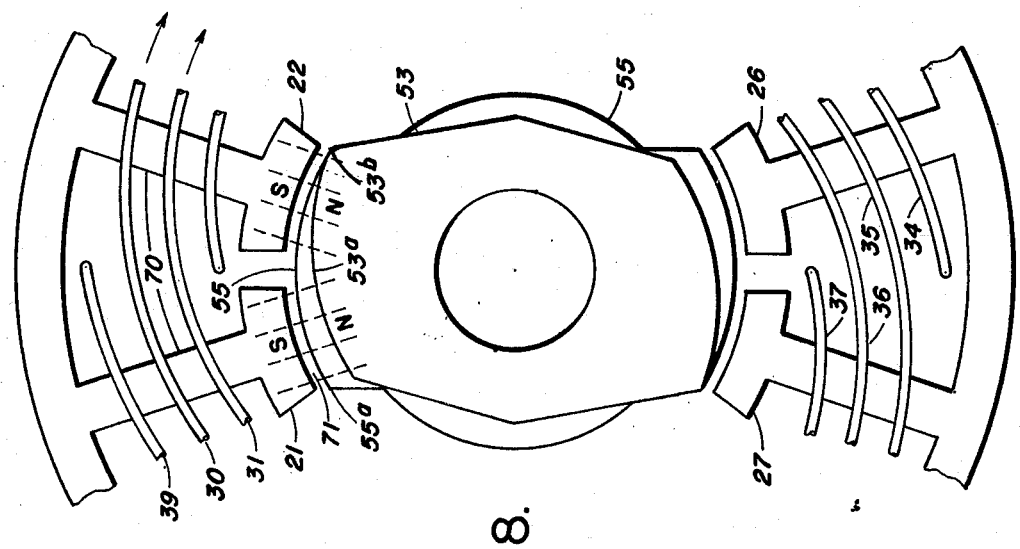
FIG. 8 is a diagrammatic representation of a magnetic pole aligned with a pair of stator poles by attracting energization of one phase of the stator winding.

As best seen in FIG. 8, the salient south pole 70 comprised of teeth 21 and 22 may be obtained when phase 42 (i.e. coils 30 and 31) is energized by passage of a current in one direction through coils 30 and 31. The salient south pole 70 thereby attracts into alignment the north pole of permanent magnet 55. As shown in FIG. 8, the magnetic lines of force produced by the salient south pole 70 are symmetrical therewith and pass through the attracted north pole of permanent magnet 55 substantially in symmetry with the latter. This condition is particularly true when as in this case the sum of the cross-sectional areas of the teeth 21 and 22 is essentially equal to the cross-sectional area of the magnetic pole of the rotor. The fact that the air gap 71, between the aligned pole 70 and the north magnetic pole of rotor 54, is of radially changing dimension does not adversely affect the alignment of the poles since effectively all of the flux extends radially of the poles.

As the rotor 55 rotates in the air gap 71 the magnetic flux is cut and current is induced in the non-magnetic sleeve 14 as a function of the rate of cutting of the flux lines. A secondary flux field results from such induced current that causes a torque reaction or resistance to the rotor movement which is a function of the rate of cutting of the flux lines across the gap thereby substantially preventing oscillation when the rotor is attracted to a new angular location.

Figure 9:
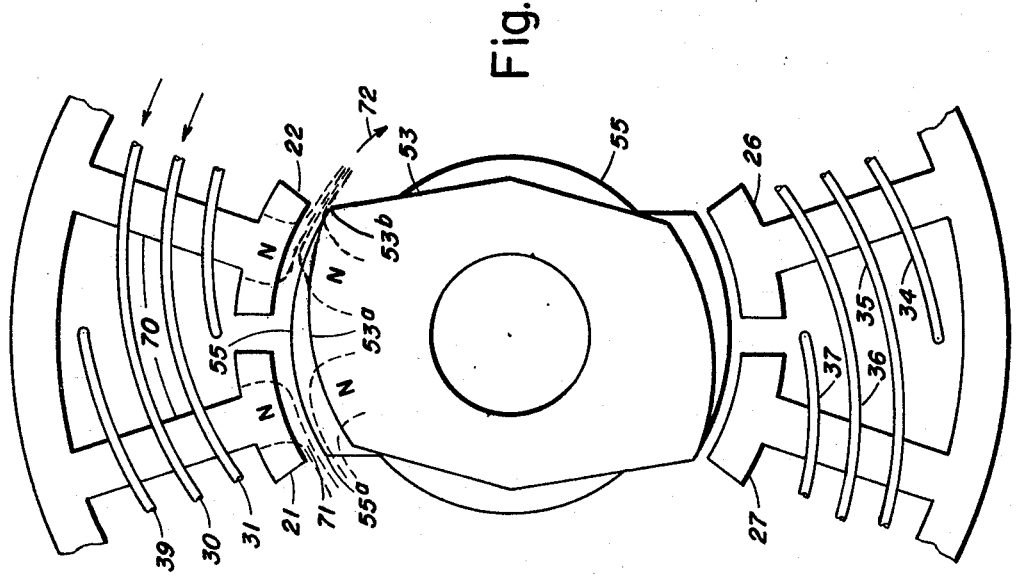
FIG. 9 is a view similar to FIG. 8 but illustrating the magnetic field produced by repelling energization of one phase of the stator winding.

Upon reversal of the magnetic field by reversal of the current direction through phase 42 or by energizing the coils of the teeth 26 and 27 which are located 180° away from teeth 21 and 22 (FIG. 9), the magnetic rotor 54 and salient pole 70 are in magnetic opposition, both being north in the illustration, and the asymmetric magnetic formation at opposite sides of the gap 71 resulting from the shape of the ends 53a of plates 53 causes a net tangential magnetic force to be exerted in a direction tangential to the arc of rotor rotation to cause incipient rotation of the rotor 54 in the direction indicated by arrow 72. After the incipient rotation the repelling magnetic force is sufficient to complete 180° rotor rotation.

It should be understood that although in this preferred embodiment the magnet 54 is sandwiched between a pair of magnetizable plates 53, if desired, however, a single plate 53 may be used.

The foregoing disclosure relates to only a preferred embodiment of the invention, and that it is intended to cover all changes and modifications of the example of the invention herein chosen for the purposes of disclosure, which do not constitute departures from the spirit and scope of the invention.

The invention claimed is:

1. In an electromagnetic indicator of the type wherein a two pole magnetic rotor is coupled to an indicator drum and is angularly positioned in response to the energization of one of a plurality of salient poles on an annular stator surrounding said rotor, said stator having a plurality of inwardly protruding teeth and a plurality of coils, each of said coils wound around a plurality of adjacent teeth with adjacent coils wound about a plurality of common teeth whereby a salient pole is formed at the midpoint of said common teeth upon energization of the coils wound thereupon, the improvement comprising, at least one magnetizable member attached to said two pole magnetic rotor with said member extending from one pole of said magnetic rotor to the other pole of said magnetic rotor and with the ends of said member at each of the poles of said magnetic rotor being asymmetrically formed whereby said asymmetrical ends will cause the rotor to move whenever said stator energizable salient pole has the same polarity as the polarity of a facing pole on said magnetic rotor.

2. An electromagnetic indicator as defined in claim 1 wherein each successive pair of adjacent coils are connected together as a single phase defining a large pole arc of centrally enhanced contour for maximum magnetic efficiency.

3. An electromagnetic indicator as defined in claims 1 or 2 wherein a pair of magnetizable members sandwich said two pole rotor thereinbetween.

4. An electromagnetic indicator as defined in claim 2, wherein each pole of said rotor is arcuately substantially coextensive with said single phase for high magnetic circuit efficiency.

5. An electromagnetic indicator as defined in claims 2 or 4, wherein said coils are each circumposed about at least three adjacent teeth and adjacent coils of said single phase extending about at least two common teeth, whereby excitation of said phase defines a salient pole magnetically enhanced centrally medially of the common teeth and excitation of adjacent phases defines a salient pole magnetically enhanced centrally medially between the salient poles of the separate phases, to provide an increased number of salient poles.

6. An electromagnetic indicator as defined in claims 1, 2, or 4, further comprising a cylindrically shaped nonmagnetizable member located in the air gap between said rotor and said stator for reducing oscillation of said rotor when said rotor is moved from one angular psition to another.

References Cited

UNITED STATES PATENTS

| | | | |
|---|---|---|---|
| 1,950,754 | 3/1934 | Schofield | 310—152 |
| 2,943,313 | 6/1960 | Gordon et al. | 340—378 |
| 3,118,138 | 1/1964 | Milas et al. | 340—378 |

G. HARRIS, Primary Examiner

U.S. Cl. X.R.

335—279; 340—378